United States Patent [19]
Watt

[11] 3,713,782
[45] Jan. 30, 1973

[54] METHOD FOR INSERTION OF PARTICULATE CATALYTIC MATERIAL IN A CATALYTIC CONVERTER HOUSING

[75] Inventor: David A. Watt, Allen Park, Mich.
[73] Assignee: Ford Motor Company, Dearborn, Mich.
[22] Filed: April 15, 1971
[21] Appl. No.: 134,250

[52] U.S. Cl. ............... 23/288 F, 23/288 R, 141/12
[51] Int. Cl. .......... B65b 1/24, F01n 3/14, B01j 9/04
[58] Field of Search .......... 23/288 R; 60/299; 141/12

[56] References Cited

UNITED STATES PATENTS

| 991,861 | 5/1911 | Lemberg | 23/288 F |
|---|---|---|---|
| 3,052,527 | 9/1962 | Andrus | 23/288 R |
| 3,587,669 | 6/1971 | Vabo et al. | 141/12 |
| 2,853,367 | 9/1958 | Karol et al. | 23/213 X |
| 3,228,755 | 1/1966 | Lottinville | 23/288 F X |
| 3,441,382 | 4/1969 | Keith et al. | 23/288 F |
| 3,445,196 | 5/1969 | Thomas | 23/288 F |
| 3,598,543 | 8/1971 | Crosby et al. | 23/288 F |
| 3,615,255 | 10/1971 | Patterson et al. | 23/288 F |

Primary Examiner—Barry S. Richman
Attorney—John R. Faulkner and Robert W. Brown

[57] ABSTRACT

A method for placing a predetermined quantity of particulate catalytic material within the housing of a catalytic converter is described. A gas-permeable and preferably heat-decomposable material is used to form a container having a fill opening. The container is filled with particulate catalytic material, after which the filled container is inserted in the catalytic converter housing.

1 Claim, 2 Drawing Figures

PATENTED JAN 30 1973

3,713,782

INVENTOR
DAVID A. WATT

BY John R. Faulkner
Robert W. Brown

ATTORNEYS

METHOD FOR INSERTION OF PARTICULATE CATALYTIC MATERIAL IN A CATALYTIC CONVERTER HOUSING

BACKGROUND OF THE INVENTION

The present invention relates to the manufacture of catalytic converters for the purification of motor vehicle exhaust gases. More particularly, the invention relates to a method for placing a predetermined quantity of particulate catalytic material within the housing of a catalytic converter.

The exhaust gases from motor vehicles equipped with internal combustion engines are mixtures of gases including unburned hydrocarbons, nitrogen oxides, carbon monoxide, and others. The presence of smog in densely populated areas has been attributed to such exhaust gases. For this reason, it has been proposed that catalytic converters be used for the purification of these exhaust gases. The catalyst within the converter aids in the selective oxidation or reduction of certain of the exhaust gas constituents. The use of more than one catalytic material may be required to obtain the necessary exhaust gas purification.

A variety of physical forms are possible for the catalytic materials used in catalytic converters. The invention, however, is concerned primarily with catalysts in the form of particles. The term "particles" as used herein is to be construed broadly and includes catalytic materials ranging in size from minute particles to pellets.

Where a particulate catalytic material is to be used in a catalytic converter, a method must be provided during the manufacture of the converter for the insertion therein of the particulate catalytic material. One method for accomplishing this is to provide the catalytic converter housing with a fill opening into which the particulate catalytic material may be poured during manufacture. This method may not be satisfactory for all catalytic converter designs. For example, pouring the particulate catalytic material into the converter housing may result in the creation of undesirable voids in the catalyst bed.

SUMMARY OF THE INVENTION

The invention provides a method for placing a predetermined quantity of particulate catalytic material within the housing of a catalytic converter during the manufacture thereof. The inventive method includes the steps of forming a container from a gas-permeable and preferably heat-decomposable material. The container is provided with an opening to permit it to be filled with the particulate catalytic material. The container is filled with the particulate catalytic material, after which the filled container is inserted into the catalytic converter housing. The use of this method is particularly advantageous because the bed of catalyst particles can be inserted as a unit into the converter housing. The catalytic converter may then be installed in the exhaust system of a motor vehicle. Subsequent use of the motor vehicle's engine will create hot exhaust gases which will be capable of passing through the gas permeable catalyst container. If the material from which the container is made is heat decomposable, it will be decomposed by combustion or other chemical or physical process.

Typical proposals for the design of catalytic converters to be used with particulate materials call for the inclusion therein of first and second catalyst retention baffles spaced from one another to provide a region for the placement of the catalytic material. Accordingly, the method of the invention may include the additional steps of placing a first catalyst retention baffle within the catalytic converter housing prior to the insertion of the particulate catalytic material therein, and placing a second catalyst retention baffle within the catalytic converter housing after the step of inserting the filled container therein. The filled container is positioned between the first and second catalyst retention baffles. Furthermore, the method of the invention may include the additional step of compressing the filled catalyst container between the first and second baffles. Moreover, the method of the invention may include the step of sealing the container fill opening prior to its insertion within the catalytic converter housing.

DETAILED DESCRIPTION OF THE INVENTION

Figure 1:
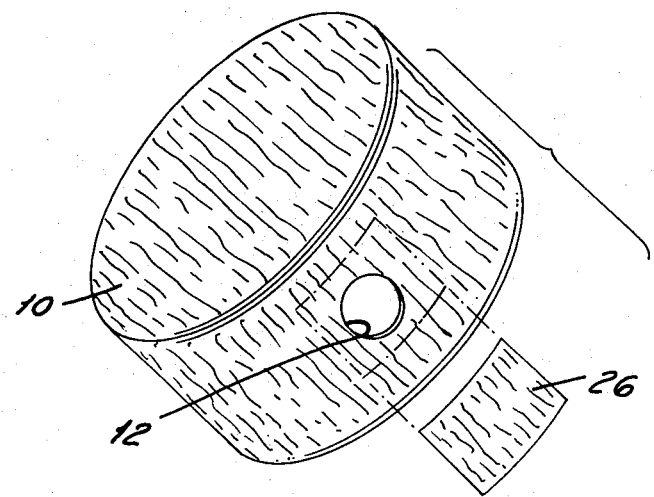
FIG. 1 is a diagrammatic view of a container having an opening to permit it to be filled with a particulate catalytic material.

With reference now to FIG. 1, there is shown a container 10 for a particulate catalytic material. The container preferably is made from a gas-permeable, heat-decomposable material. For example, the container 10 may be made from a gas-permeable fibrous paper. In such case, the fibrous paper may be impregnated with a suitable resinous material or chemical compound to aid in its decomposition upon contact with exhaust gases. A compressible, gas-permeable, non-decomposable material, such as fiberglass, could also be used to form the container 10. Items to be considered in the selection of the material for the container 10 include the position to be occupied by the catalytic converter in the motor vehicle exhaust system, the type of catalyst to be employed, potential damage to the catalyst bed caused by decomposition of the container 10, the maximum permissible temperature in the catalytic converter, and the like. The container 10 has an opening 12 to permit it to be filled with a particulate catalytic material.

Figure 2:
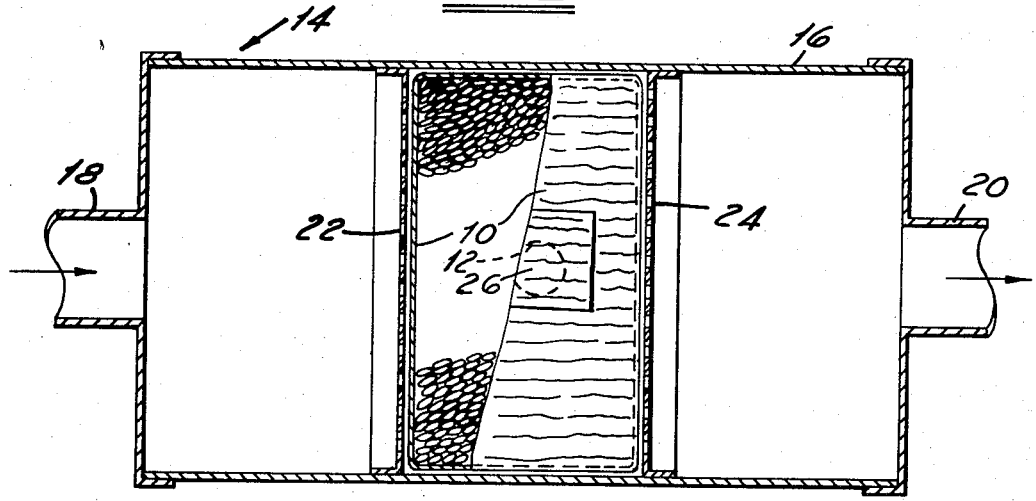
FIG. 2 is a diagrammatic sectional view of a catalytic converter containing first and second catalyst retention baffles and including a filled and sealed container such as that shown in FIG. 1.

FIG. 2 is a diagrammatic sectional view of a catalytic converter, designated generally by the numeral 14. The catalytic converter 14 includes a housing 16 having an exhaust gas inlet 18 and an exhaust gas outlet 20. Within the catalytic converter housing 16 is positioned a first catalyst retention baffle 22 and a second catalyst retention baffle 24 spaced from the first baffle 22. Both the first and second catalyst retention baffles contain openings to permit the passage of exhaust gases therethrough. These baffles may be of any suitable form. For example, they may comprise perforated plates or screens.

The gas-permeable, and preferably heat-decomposable container 10 is filled with particulate catalytic material and inserted in the converter housing 16. Prior to the insertion of the container 10 in the housing 16 of the catalytic converter, the fill opening 12 preferably is sealed to prevent the expulsion of the catalyst from the container. This may be accomplished, for example, by the placement of a cover 26 (FIG. 1) over the fill opening 12 and by adhesively bonding the cover 26 to the container 10.

From the above, it is apparent that the first step in the inventive method for placing a predetermined quantity of particulate catalytic material within the housing of a catalytic converter comprises forming a container from a gas-permeable and heat-decomposable material. The container is provided with an opening to permit it to be filled with the particulate catalytic material. The size and geometric shape of the container necessarily depends upon the space to be provided therefor in the housing of the catalytic converter. For example, the container may be toroidally, cylindrically, or disc-shaped.

After the container has been formed, it is filled with the particulate catalytic material. The filled container is then inserted into the catalytic converter housing. Prior to its insertion in the housing, the container may be sealed to prevent the expulsion of the particulate catalytic material.

Additional steps in the manufacture of the catalytic converter may include placing a first catalyst retention baffle within the catalytic converter housing prior to the insertion therein of the container filled with particulate catalytic material; and the step of placing a second catalyst retention baffle within the catalytic converter housing after the filled container is inserted therein. In such case, the filled container occupies the space between the first and second catalyst retention baffles. If desired, the filled catalyst container can be compressed between the first and second catalyst retention baffles, thereby, to provide further assurance of the absence of voids in the catalyst bed.

The invention having thus been described, what is claimed and desired to be protected by Letters Patent is:

1. In the manufacture of catalytic converters for the purification of motor vehicle exhaust gases, a method for placing a predetermined quantity of particulate catalytic material within the housing of said catalytic converter, which comprises the steps of: forming a container from a gas-permeable, compressible and heat decomposable material, said container being provided with an opening to permit it to be filled with said particulate catalytic material; filling said container with said particulate catalytic material; placing a first catalyst retention baffle within said catalytic converter housing; inserting said filled container into said catalytic converter housing; placing a second catalyst retention baffle within said catalytic converter housing, said filled container occupying the space between said first and second catalyst retention baffles; compressing said filled container between said first and second catalyst retention baffles, thereby, to remove voids in the catalyst bed and decomposing said container by the application thereto of said motor vehicle exhaust gases.

* * * * *